United States Patent [19]

Brichard et al.

[11] 4,215,097

[45] * Jul. 29, 1980

[54] PROCESS FOR THE MANUFACTURE OF SODIUM PERBORATE MONOHYDRATE AND PRODUCT THEREOF

[75] Inventors: Jean Brichard, Vilvoorde; Jean-Claude Colery, Brussels, both of Belgium

[73] Assignee: Interox, Brussels, Belgium

[*] Notice: The portion of the term of this patent subsequent to Apr. 19, 1995, has been disclaimed.

[21] Appl. No.: 895,273

[22] Filed: Apr. 10, 1978

Related U.S. Application Data

[63] Continuation-in-part of Ser. No. 737,686, Nov. 1, 1976, Pat. No. 4,115,519.

[30] Foreign Application Priority Data

Apr. 8, 1977 [LU] Luxembourg ............................ 77094

[51] Int. Cl.² ............................................. C01B 15/12
[52] U.S. Cl. ................................... 423/279; 423/268; 423/271
[58] Field of Search ............... 423/279, 280, 281, 268; 23/303 T

[56] References Cited

U.S. PATENT DOCUMENTS

| | | | |
|---|---|---|---|
| 3,109,706 | 11/1963 | Leblon et al. | 423/281 |
| 3,194,768 | 7/1965 | Lindner et al. | 423/272 |
| 3,914,380 | 10/1975 | Dillenburg | 423/279 |
| 4,071,462 | 1/1978 | Matsunga | 423/281 X |
| 4,115,519 | 9/1978 | Brichard et al. | 423/279 |

FOREIGN PATENT DOCUMENTS

| | | | |
|---|---|---|---|
| 495383 | 8/1950 | Belgium | 423/281 |
| 944121 | 12/1963 | United Kingdom | 423/281 |
| 1211228 | 11/1970 | United Kingdom | 423/281 |

*Primary Examiner*—G. O. Peters
*Attorney, Agent, or Firm*—Spencer & Kaye

[57] ABSTRACT

Abrasion resistant granules of sodium perborate monohydrate are made by introducing an aqueous solution containing hydrogen peroxide and an aqueous solution containing sodium metaborate simultaneously into a fluidized bed dryer which contains seeds of a size smaller than that of the desired granules. At least one surface active agent is introduced into at least one of the aqueous solutions containing hydrogen peroxide and sodium perborate. Water present in the aqueous solutions is evaporated by fluidization gas which is introduced into the fluidized bed dryer. The process produces, in one stage, granules of sodium perborate monohydrate having a high rate of dissolution, good flowability, abrasion resistance, and other desirable properties.

15 Claims, 2 Drawing Figures

PROCESS FOR THE MANUFACTURE OF SODIUM PERBORATE MONOHYDRATE AND PRODUCT THEREOF

CROSS-REFERENCE TO RELATED APPLICATION

This application is a continuation-in-part of application Ser. No. 737,686, filed on Nov. 1st, 1976 now U.S. Pat. No. 4,115,519.

BACKGROUND OF THE INVENTION

The present invention relates to a process for manufacturing a sodium perborate monohydrate in the form of granules and to the granules thus obtained.

There is a market for sodium perborate monohydrate on the one hand because of its elevated active oxygen content (theoretical value 16.03% corresponding to the formula $NaBO_3.H_2O$), and on the other hand because it is stable at a higher temperature than sodium perborate tetrahydrate. It is thus used in special washing powders, in solid compositions for bleaching and in different particular cleaning agents.

Up to now, the usual process for manufacturing sodium perborate monohydrate has involved the dehydration of the tetrahydrated product. Various methods of dehydration are noted in the literature, for example, fluidized bed processes such as that described in Belgian Patent No. 718,160 filed July 17, 1968.

These processes have the disadvantage of requiring two successive operations, one leading to the manufacture of sodium perborate tetrahydrate, the other consisting of the dehydration of this product. Moreover, the active oxygen losses are relatively high in view of the accumulation of the losses in the manufacture of sodium perborate tetrahydrate together with those observed during the super-drying of the product. Finally, the product obtained is porous and friable.

A one stage process for manufacturing sodium perborate with an elevated active oxygen content by reaction of a boron source (boric acid, borax or metaborates), sodium hydroxide and hydrogen peroxide in aqueous solution was the object of a U.S. Pat. No. 2,937,998 issued May 24th, 1960.

This process has a number of disadvantages. Its technology is complicated. Also, the product obtained is friable and has a very fine granulometric structure, which means that a subsequent agglomeration operation is necessary in order to obtain granules of a size which is compatible with those of the other constituents of washing powders.

In Belgian Patent No. 847,617, filed on Oct. 25th, 1976, and corresponding to U.S. patent application Ser. No. 737,686, filed on Nov. 1st, 1976, process described for the manufacture of sodium perborate monohydrate in the form of granules resistant to abrasion, according to which an aqueous solution containing hydrogen peroxide and an aqueous solution containing sodium metaborate are simultaneously introduced into a fluidized bed dryer containing seeds of smaller dimensions than the granules to be obtained, and the excess water present in the said aqueous solution is evaporated by means of a fluidizing gas which is introduced into the fluid bed dryer.

Although the rate of dissolution in water of the sodium perborate monohydrate granules thus obtained according to Belgian Patent No. 847,617, is relatively high, it is occasionally insufficient for certain applications.

SUMMARY OF THE INVENTION

It has now been discovered, in accordance with the present invention, that the rate of dissolution of the sodium perborate monohydrate granules obtained according to the process described in the above referred to Belgian Patent No. 847,617, corresponding to U.S. patent application Ser. No. 737,686, can be readily increased.

In accordance with the present invention, a process is provided for the manufacture of sodium perborate monohydrate in granular form which is resistant to abrasion, in which an aqueous solution containing hydrogen peroxide and an aqueous solution containing sodium metaborate are introduced simultaneously into a fluidized bed dryer containing seeds of smaller dimensions than the granules to be obtained, the excess water present in the said aqueous solution is evaporated with fluidizing gas which is introduced into the fluidized bed dryer, and wherein at least one surface active agent is introduced into at least one of the aqueous solutions containing hydrogen peroxide and sodium metaborate.

The process of the present invention is particularly interesting because it enables one to obtain, in one stage, granules of sodium perborate monohydrate which have a high rate of dissolution, good flowability, a low abrasion index, an apparent specific weight close to that of other constituents of washing powders and adequate size which is compatible with that of the other constituents of the powders. The granules thus obtained also have the supplementary advantage of having an active oxygen content which is very close to the theoretical maximum. Finally, the losses in hydrogen peroxide proved to be very low in manufacture, not exceeding 5% in weight. The present invention further relates to sodium perborate monohydrate granules which contain at least 0.001 to 5 wt % of a surface active agent.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

DETAILED DESCRIPTION OF THE INVENTION

Figure 1:
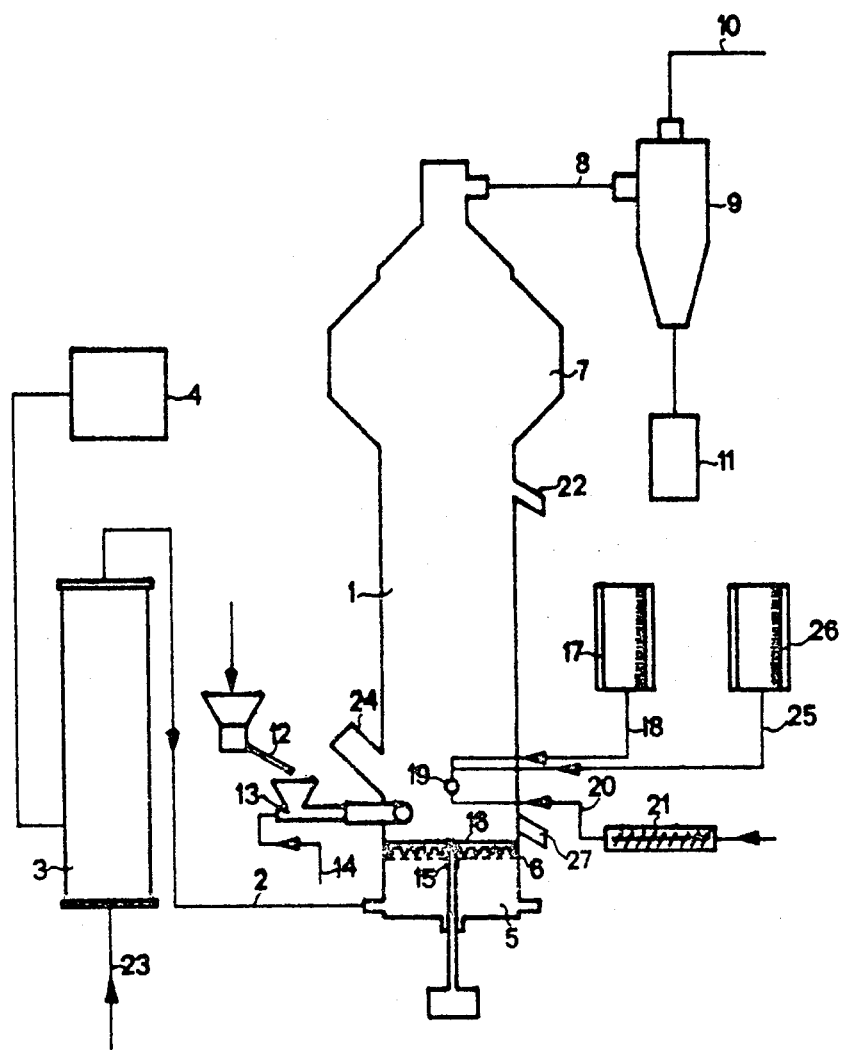
FIG. 1 shows one embodiment of an apparatus for carrying out the method of the present invention.

Surface active agents of any type can be used in the process according to the present invention. They can be selected from non-ionic, anionic, cationic, amphoteric or ampholytic surface active agents. A single surface active agent can be used or a mixture of surface active agents. Advantageously at least one non-ionic surface active agent is used. It is also possible to use a non-ionic surface active agent alone or in mixture with other surface active agents.

Numerous non-ionic surface active agents can be used. These non-ionic surface active agents usually incorporate in their structure, ether, hydroxyl, amine oxide, sulfoxide or phosphine oxide groups or alkylolamide groups.

Certain of these non-ionic surface active agents which are of special interest are obtained by the condensation of ether polyols with long chain alcohols, fatty acids, fatty amines, fatty acid amides, alkyl phenols or sulfonic acids. These condensation products usually contain 2 to 100 ether groups per molecule, and preferably 3 to 60 ether groups, whereas the alkyl chains generally contain 8 to 20 carbon atoms.

Condensates which are particularly advantageous to use are the reaction products of ethylene oxide, propylene oxide or glycides with alcohols, phenols or fatty acids. Condensates of alkyl phenol with ethylene oxide are particularly suitable.

The addition products of polyoxyethylene or polypropylene glycol, the reaction products of mono-, di- or polyhydroxyalkylamines with amides or polyhydroxycarboxylic acids or amine oxides or oxysulfides containing a long alkyl chain which may contain 10 to 20 carbon atoms and which may possibly be ethoxylated can also be used as non-ionic surface active agents.

Although non-ionic surface active agents are preferred, it is however, also possible to introduce other surface active agents into the aqueous solution introduced into the fluidized bed. These latter solutions can be used in the presence or in the absence of non-ionic surface active agents.

Among the anionic surface active agents which can be incorporated into the aqueous solutions suitable for the process of the present invention are in particular: the sulfonates and sulfates such as alkylarylsulfonates, for example, dodecylbenzenesulfonate, alkylethylsulfonates, alkenylsulfonates, alkylsulfonates, alkyl sulfates, fatty alpha-sulfoacid esters, sulfates of ethoxyl alcohol or sulfates of ethoxyl amides. Other suitable surface active agents are natural or synthetic alkaline soaps of fatty acids and the complex long chain esters of acids derived from phosphorus.

Anionic surface active agents may be used in the form of sodium potassium or ammonium salts or the salts of organic bases such as mono-, di- or triethanolamine.

Examples of cationic surface active agents which can be mentioned are particular octadecylamine chlorohydrate and other quaternary ammonium type derivatives of linear long chain amines containing 8 to 18 carbon atoms.

The ampholytic and amphoteric surface active agents may include derivatives such as 3-(N,N-dimethyl-N-hexadexylammonio) propane-1-sulfonate or 3-(N,N-dimethyl-N-hexadecylammonio)-2-hydroxy-propane-1-sulfonate, alkylsulfobetaines, amidoalkenesulfonates, aliphatic amines substituted by a carboxy-, sulpho-, phosphate-, or phosphino- group.

This list of surface active agents is given as an example. It is obvious that surface active agents other than those indicated above can also be used such as those mentioned in the publication "Surface Active Agents" by A. M. Schwarz and J. W. Perry.

The surface active agents are usually used in such proportions that their concentration in the sodium perborate monohydrate is between 0.001 and 5 wt %, preferably between 0.01 and 2 wt %. The surface active agents are introduced into the aqueous solution of hydrogen peroxide and/or of sodium metaborate. They are introduced advantageously into the aqueous solution of sodium metaborate.

In the practice of the present invention, the temperature of the fluid bed does not exceed the temperature at which sodium perborate monohydrate begins to decompose, i.e. about 100° C. It is generally between the ambient temperature and 100° C., usually between 35° and 95° C. and preferably between 45° and 85° C. The temperature of the air or other fluidizing gas introduced at the bottom of the fluidized bed, e.g. through a gauze or a distribution plate, can vary within wide limits, chiefly depending on the temperature one wishes to maintain in the bed, the amount of water to be removed and the flow rate of the fluidizing gas. Most often it is between 110° and 250° C. Other temperatures can, however, by equally suitable.

The aqueous solution containing hydrogen peroxide can contain very variable quantities of this product. It is of advantage to use aqueous solutions containing from 5 to 60% in weight of hydrogen peroxide and preferably from 15 to 40% by weight. It is also of advantage to use aqueous solutions containing from 5 to 75% by weight of hydrogen peroxide and preferably from 15 to 70%. Lower concentrations are of little value in economic terms because the amount of water to be evaporated is then very high. On the other hand, it is not very desirable to use higher concentrations as the solutions are dangerous to handle.

The aqueous solution containing hydrogen peroxide can also, if required, contain certain additives which are particularly able to improve its stability, such as those mentioned in the book by W. C. Schumb et al (*Hydrogen Peroxide*, Reinhold Publ. Corp. New York, 1955). Of these, the stannate and the phosphate of sodium are suitable. These stabilizers are often added although they are not absolutely necessary. These stabilizers are generally used at the rate of 0.001 to 1% by weight based on the weight of 100% hydrogen peroxide.

Other additives can also be added to the solution of hydrogen peroxide, such as, e.g.: perborate stabilizers like those mentioned by W. Machu (*Das Wasserstoffperoxyd und die Perverbindungen*, - Hydrogen peroxide and the per compounds-Vienna, 1951, Springer), and more specifically, magnesium sulfate; corrosion inhibitors such as the nitrates; and agents to adjust pH. The perborate stabilizers can be used at the rate of 1 to 50 g of stabilizer per kg of 100% hydrogen peroxide. These additives are not absolutely necessary however.

The aqueous solution containing sodium metaborate can contain very variable quantities of this product within the limits of its solubility, these limits being a function of the temperature of the solution of course. In general, solutions containing from 5 to 40% in weight of sodium metaborate, calculated as $NaBO_2$, are used. Solutions obtained industrially by action of solutions of sodium hydroxide on boron minerals are especially suitable. These solutions usually contain from 10 to 35%, preferably 10 to 25%, by weight of sodium metaborate calculated as $NaBO_2$.

An additive which permits the avoidance of premature crystallization of the perborate in an injector when the two solutions are introduced into the fluid bed by the same injector can also be added either to the solution containing the hydrogen peroxide, or to the solution containing the sodium metaborate, or to both, but this is not absolutely necessary. Several additives can be used for this purpose, such as, e.g. sodium hexametaphosphate.

The molar ratio hydrogen peroxide: sodium metaborate sent to the fluid bed is generally almost equal. Preferably, there is a very slight excess of hydrogen peroxide. Usually, this ratio is between 1 and 1.1 or 1.12 and preferably between 1.001 and 1.05 or 1.10. Higher quantities of hydrogen peroxide are of no use in the production of sodium perborate monohydrate.

The solutions of the reagents are introduced into the fluidized bed at the same time, either separately by means of two separate injectors or by a single injector, premixing taking place inside or at the entrance to the injector. These solutions are introduced right into the center of the fluidized bed by any well-known method. For example, one can use pneumatic injectors such as atomizers for this purpose.

The temperature of the solutions can vary within quite broad limits. Preferably, the temperature does not exceed that of the fluidized bed so that premature crystallizations in the injectors are avoided when concentrated solutions are being used. Temperatures between the ambient temperature and 70° C., preferably between 25° and 50° C., are generally used. The temperatures of the two solutions do not necessarily have to be the same.

When the fluidized bed is put into operation, seeds, the dimensions of which are smaller than those of the granules of sodium perborate monohydrate which one desires to obtain, are introduced into the bed. Preferably, these seeds are particles of sodium perborate monohydrate. Particles of other inorganic persalts, such as sodium percarbonate, sodium perborate tetrahydrate or perhydrated phosphates, may also be suitable as they also ensure a homogeneous distribution of the active oxygen in the granules.

During operation, the presence in the fluid bed of seeds whose dimensions are smaller than that of the granules one wishes to obtain is also absolutely necessary. These seeds are, at least in part, composed of fine sodium perborate monohydrate produced normally in the bed. One can also increase the proportion of seeds by voluntarily introducing some fine sodium perborate monohydrate into the bed or by mechanically destroying, in the middle of the bed itself, a part of the granules already formed, or again by using both these processes at the same time.

The particles of fine sodium perborate monohydrate which can be introduced into the bed may originate from production rejects after grinding outside the fluidized bed of granules of sodium perborate monohydrate produced in the dryer which are too coarse, from recycling of fines carried out of the bed by the fluidization gas, from manufacture by another process, from grinding of sodium perborate monohydrate particles, or from several of these possibilities all at once.

It is possible to equip the fluidized bed dryer with one or more devices such as grinders, agitators or scrapers which mechanically destroy the agglomerates and promote the formation of seeds at the same time. These devices also enable one to prevent the bed from compressing and agglomerating. These devices are, however, hardly ever used in large sized fluid beds because agglomerates do not form in them. In this case, it is generally preferred that recycled or reject fine sodium perborate monohydrate is introduced into the fluid bed when one wants to increase the proportion of seeds in the bed. The technique preferably used to increase the proportion of seeds in the bed consists of recycling the fines carried out of the bed by the fluidization gas.

The feeding of solid material (seeds) to the fluidized bed dryer can be done by any known method, e.g. by means of a Venturi system. The solid seed material generally has an average particle diameter less that 0.4 mm, most often it is between 0.01 and 0.35 mm. It is quite clear that these values are only given by way of example and that seed particles of different dimensions can be used.

The dimensions of the granulated product particularly depend on the proportion of seeds present in the bed, the size of the granulated product being inversely proportional to the seed content. The size of the grains will thus be inversely proportional to the quantity of fine sodium perborate monohydrate introduced voluntarily into the bed and to the degree of utilization of the mechanical grain destruction devices (grinders, etc.), which may be situated in the bed.

The dimensions of the granulated product also depend on the pressure of the gas in the injector or injectors by means of which the solutions are introduced into the bed, the size of the grains being inversely proportional to the pressure.

It is thus relatively easy to regulate the dimensions of the granules to the value desired by varying the proportion of seeds in the bed either by introducing seeds or by internal destruction of the granules or by varying the pressure in the injectors or again by using these two methods at the same time.

The process according to the invention can be carried out either continuously or discontinuously. The fluidized bed dryer can be cylindrical shape, or cylindrico-conical shape, or in the shape of a parallelepiped or any other shape which allows one to carry out the process.

The granules can be brought out of the apparatus by any known device, e.g. by elutriation via the bottom of the dryer, or via a small lateral tube fitted at the base of the dryer, or by flowing out via a small lateral tube above the base of the dryer, this tube thus determining the height of the fluidized bed.

The gases emitted from the fluid bed pass through a fines separator such as e.g. a cyclone. The gases extracted can either be sent into the atmosphere or recycled to the fluid bed, either in part or in total, after the water vapor they contain has been removed by drying or condensation.

Figure 2:
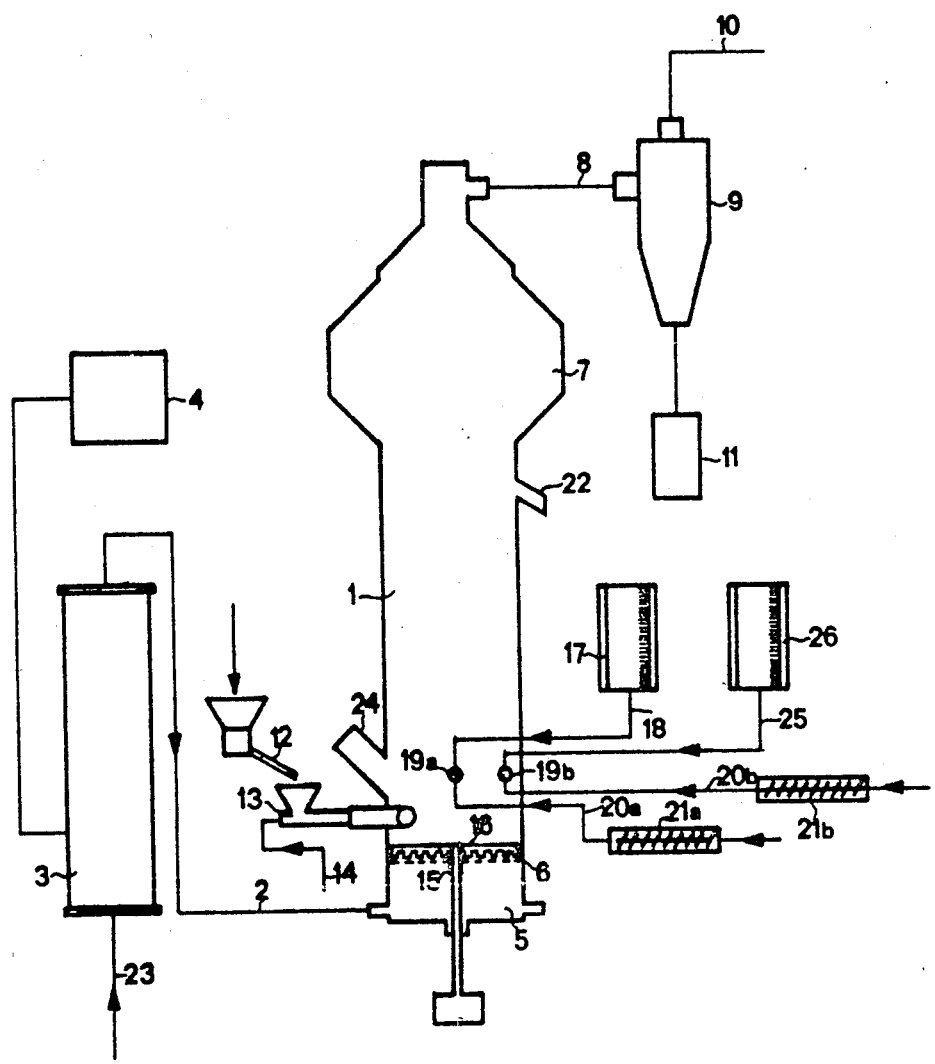
FIG. 2 shows another embodiment of an apparatus for carrying out the method of the present invention.

The process according to the invention can be carried out in apparatus such as those shown in FIGS. 1 and 2, for example, which show ways of carrying out the process according to the invention.

FIG. 1 shows a particles bed 1 fluidized by means of a gas such as air which enters the system by means of a conduit 2 after having been preheated in a preheater 3 fed with air by a conduit 23, the temperature of which is regulated by means of a regulator 4. The hot air passes into a lower chamber or wind box 5, through a grid 6 and reaches the fluid bed, above which there is an area 7 into which fines pass with the gas to a cyclone or collector 9 for return of a proportion of the fines to the fluid bed. The grid 6 is pierced in the center by a hole 15 through which the shaft of a fixed blade scraper 16 can pass. A tube 24 allows a grinder (not shown) to be introduced into the base of the bed.

The gases emitted from the fluid bed pass by a conduit 8 into a fines collector or cyclone 9 and leave the apparatus through a ventilator line 10. The fines are recovered in a vessel 11.

The seeds which are notably made up of all the fines recovered in vessel 11 are sent, via a vibrating channel 12, into the fluid bed 1 with the aid of a Venturi 13 fed with compressed air through a conduit 14.

The solution containing hydrogen peroxide leaves a thermostatic storage tank 17 through a conduit 18. Storage tank 18 is maintained at the required temperature. The sodium metaborate leaves thermostatic storage tank 26 through a conduit 25 and tank 26 is also maintained at the required temperature. The two temperatures can be the same or different. The two solutions are mixed and atomized in the fluid bed with the aid of an atomizer 19, fed with compressed air by way of an air feed line 20, the air being heated in a heater 21.

The granulated product is collected either by flowing out through an overflow conduit 22 at the top or by elutriation through a conduit 27 at the bottom of the bed.

FIG. 2 shows an apparatus similar to that shown in FIG. 1 in which the single atomizer is replaced by two atomizers and in which there is no provision for removal by elutration via the base of the reactor.

The solution containing hydrogen peroxide leaves the thermostatic storage tank 17, maintained at the desired temperature, through conduit 18 and is atomized in the fluid bed with the aid of an atomizer 19a, fed with compressed air through a conduit 20a, the air being heated in a heater 21a.

The solution containing sodium metaborate leaves the thermostatic storage tank 26, maintained at the desired temperature, through conduit 25, and is atomized in the fluid bed with the aid of an atomizer 19b, which is fed with compressed air through a conduit 20b, the air being heated in a heater 21b.

The other characteristics of this apparatus are the same as those of the apparatus shown in FIG. 1.

A further object of the present invention concerns the granules containing sodium perborate monohydrate which are obtained in the process according to the present invention. These granules containing sodium perborate monohydrate contain from 0.001 to 5% by weight of at least one surface active agent such as defined hereabove.

The granules of monohydrated sodium perborate forming the object of the present invention present an increased rate of dissolution in water.

The granules forming the object of the present invention can be utilized for the preparation of compositions for cleaning and bleaching. These granules generally retain the desirable characteristics of the granules described in the above referred to Belgian Patent No. 847,617 corresponding to U.S. patent application Ser. No. 737,686, except the apparent specific gravity which may be slightly higher. Thus, the granules of the present invention are characterized by the apparent specific gravity, when free flowing, of between 0.40 and 1.3 kg/dm$^3$ and preferably between 0.45 and 1.20 kg/dm$^3$, a flowability expressed in terms of the time taken for a 250 g quantity of the granules to flow through the 16 mm diameter mouth of a short stemmed analysis funnel not exceeding 10 seconds, and by an abrasion index not exceeding 10%. These values are determined according to the methods described in the above referred to Belgian Patent No. 847,617 and corresponding U.S. patent application Ser. No. 737,686, now U.S. Pat. No. 4,115,519. Thus, the abrasion index referred to in the present invention was measured according to the test described in the standard ISO/TC47/WG11 (secretariat -86) 167 of the British Standards Institution.

The dimensions of the granules can vary within quite broad limits. Preferably, however, granules will be prepared whose granulometry is close to that of the other components of detergent powders. In general, a granulometry such that at least about 80% of the granules have a diameter between 0.1 and 1.5 mm is particularly suitable. An advantageous average diameter for the particles will be between 0.3 and 0.7 mm. Nonetheless, by modifying the conditions of the granule preparation method as disclosed above, one can prepare larger or smaller granules while still maintaining the characteristics of the product as regards flowability, apparent specific gravity, and abrasion index.

The sodium perborate monohydrate product which forms the object of the present invention is particularly interesting compared with products obtained in the past because it combines an increased rate of dissolution in water with the better abrasion index, better flowability, and a very low fines content obtained according to Belgian Patent No. 847,617. Moreover, the product does not agglomerate.

In order to illustrate the invention without, however, limiting its scope, there follow some examples of ways of carrying out the process. The apparatus and working methods described below can also be replaced by equivalents which will be well-known to those skilled in the art.

EXAMPLES 1 AND 2

Two tests reproduced below are carried out in an apparatus of the same kind as the one shown in FIG. 1. The fluid bed has a parallelepipedic shape of 150 mm width, 300 mm length and 900 mm height. The granules are removed by flowing out via a tube above the base of the dryer, situated 600 mm from the distribution of the grid.

The bed of particles is fluidized by the introduction of 80 Nm$^3$/h of a current of air heated at a temperature of 160° C. through the grid or gas distribution plate 6. The temperature of the fluidized bed is 74° C. In each test, the dryer is continuously fed with an aqueous solution containing 50% by weight of hydrogen peroxide and 1.6% by weight of MgSO$_4$.7H$_2$O, and an aqueous solution containing 30% by weight of NaBO$_2$ by means of one atomizer which dips into the center of the fluid bed. The molar ratio H$_2$O$_2$/NaBO$_2$ at introduction is equal to 1.07 and the solutions of H$_2$O$_2$ and NaBO$_2$ are respectively introduced with a flow rate of 0.66 and 2.0 kg/h.

In the first test performed by way of comparison, the aqueous solution containing 30% by weight of NaBO$_2$ did not contain a surface active agent so that no surface active agent was used in the preparation of the product. The granular product obtained from this first test is referred to as Sample B.

In the second test, conducted according to the process of the present invention, the aqueous solution containing 30% by weight of NaBO$_2$ further contained 1.5 g of TENSOPHENE I 10 (condensate of ethylene oxide with an alkyl phenol sold by the firm TENSIA-LIEGE) per kg of sodium metaborate. The granular product obtained from this second test is referred to as Sample A.

The sodium perborate monohydrate yield in each test is equal to about 100%, and the product in each test has an average diameter of 0.510 mm, an active oxygen content of 160 g/kg and an apparent specific gravity of respectively 0.96 (Test 1) and 1.07 (Test 2) kg/dm$^3$.

The rate of dissolution of 2 g of each of the samples obtained in the first test (Sample B) and in the second test (Sample A) in one (1) liter of water at a rate of agitation of 330 rpm was measured. The results obtained are given in the following Table.

TABLE

| Sample | | A | B |
|---|---|---|---|
| | | wt% dissolved | |
| Temperature: | 15° C. | | |
| duration: | 1 min. | 20 | 13 |
| | 3 min | 55 | 28 |
| | 15 min | 95 | 76 |
| Temperature: | 40° C. | | |
| duration: | 1 min | 92 | 86 |
| | 3 min | 99 | 97 |
| | 15 min | 100 | 100 |

An examination of the results given in the table above shows that the introduction of a non-ionic surface active agent into the sodium perborate monohydrate makes it possible to increase the rate of dissolution substantially.

It will be understood that the above description of the present invention is susceptible to various modifications, changes and adaptations, and the same are intended to be comprehended within the meaning and range of equivalents of the appended claims.

What is claimed is:

1. Process for the production of sodium perborate monohydrate in granular form and resistant to abrasion, in which an aqueous solution containing hydrogen peroxide and an aqueous solution containing sodium metaborate are introduced simultaneously into a fluidized bed dryer containing seeds of dimensions smaller than the granules which are to be obtained, and the excess water present in the said aqueous solutions is evaporated by means of a fluidizing gas which is introduced into the fluidized bed dryer, comprising: introducing at least one surface active agent into at least one of the aqueous solutions containing hydrogen peroxide and sodium metaborate.

2. Process according to claim 1, wherein the surface active agent is at least one agent selected from the group consisting non-ionic, anionic, cationic, ampholytic and amphoteric surface active agents.

3. Process according to claim 2, wherein the surface active agent is a non-ionic surface active agent.

4. Process according to claim 3, wherein the surface active agent is a condensate of alkyl phenol with ethylene oxide.

5. Process according to claim 1, wherein the surface active agent is used in a ratio of 0.001 to 5 wt.% in relation to the sodium perborate monohydrate obtained.

6. Sodium perborate monohydrate granules of an apparent specific gravity when free flowing of 0.40 to 1.3 $Kg/dm^3$, of a flowability expressed by the time taken for a 250 gram quantity of granules to pass through the 16 mm diameter mouth of a short stemmed analysis funnel not exceeding 10 seconds and an abrasion index not exceeding 10% as determined by the method described in the Standard ISO/TC 47/WG11 (secretariat -86) 167 of the British Standards Instutition, which contain 0.001 to 5 wt.% of a surface active agent.

7. Granules according to claim 6, wherein the surface active agent is at least one agent selected from the group consisting of non-ionic, anionic, cationic, ampholytic and amphoteric surface active agents.

8. Granules according to claim 7, wherein the surface active agent is a non-ionic surface active agent.

9. Granules according to claim 8, wherein the surface active agent is a condensate of alkyl phenol with ethylene oxide.

10. Granules according to claim 6, which contain 0.01 to 2 wt.% of a surface active agent.

11. Sodium perborate monohydrate granules prepared according to the process of claim 1 which contain 0.001 to 5 wt.% of a surface active agent.

12. The granules of claim 11 which contain 0.01 to 2 wt.% of a surface active agent.

13. The granules of claim 11 wherein said surface active agent is a non-ionic surface active agent.

14. The granules of claim 13, wherein said non-ionic surface active agent is a condensate of alkyl phenol with ethylene oxide.

15. The granules of claim 11, wherein the surface active agent is at least one agent selected from the group consisting of non-ionic, anionic, cationic, ampholytic and amphoteric surface active agents.

* * * * *